March 12, 1963  F. S. WEISS  3,080,908
TERMINAL WIRE FORMING AND ASSEMBLY APPARATUS
FOR ELECTRICAL COMPONENTS
Filed March 13, 1959  2 Sheets-Sheet 1
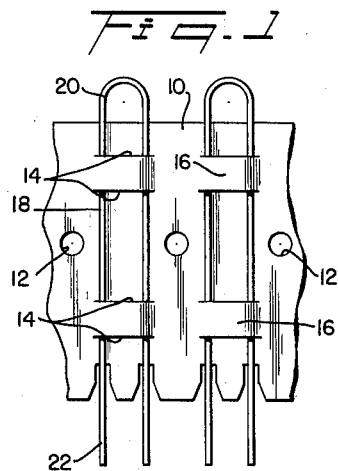
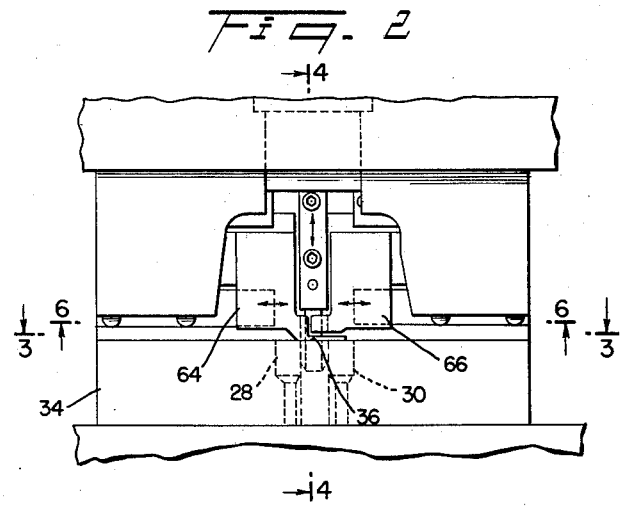
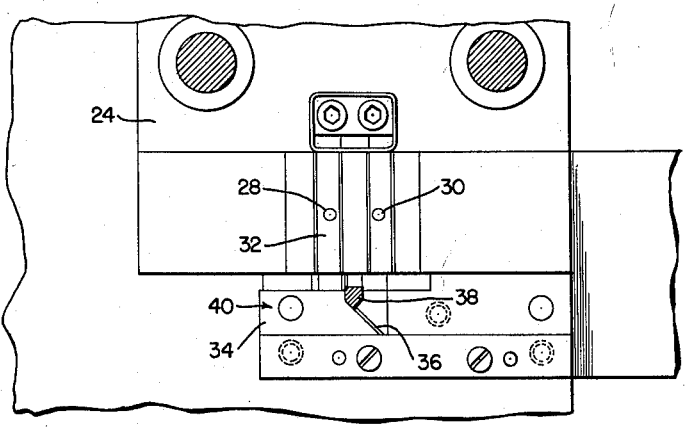
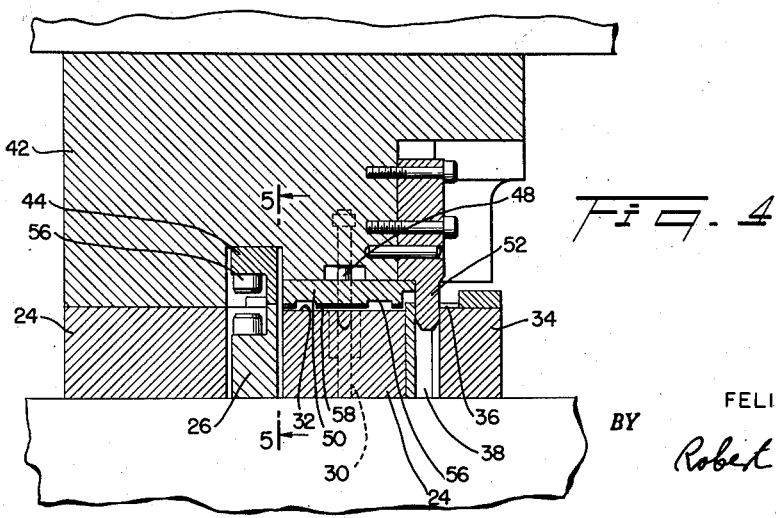
INVENTOR.
FELIX S. WEISS
BY Robert E. Isner
ATTORNEY

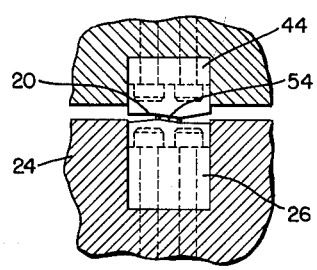
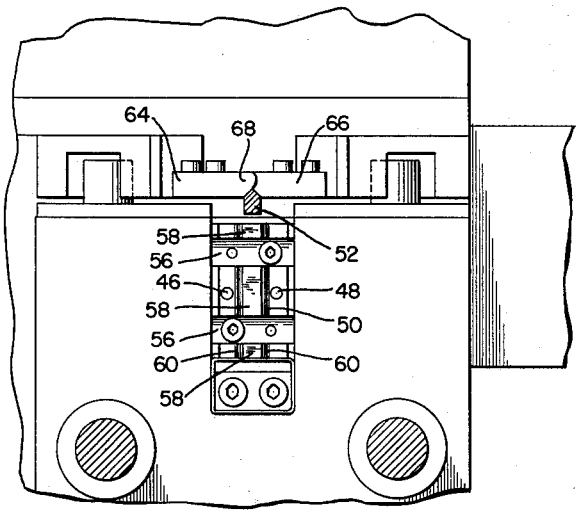
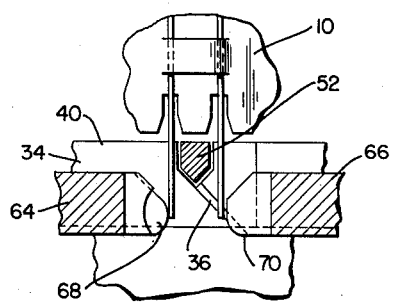
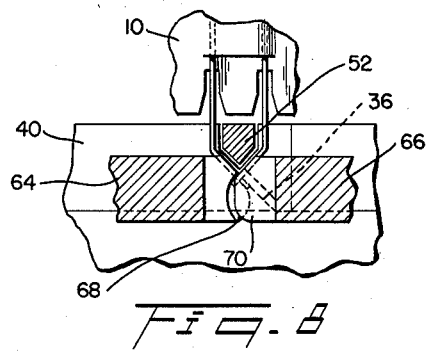
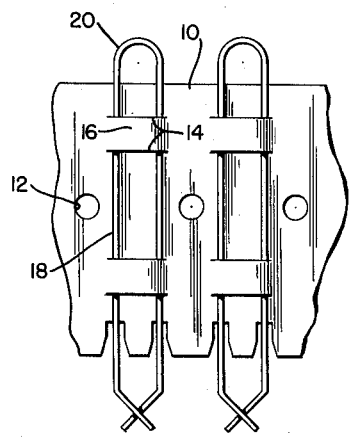
INVENTOR.
FELIX S. WEISS
BY
ATTORNEY United States Patent Office 3,080,908
Patented Mar. 12, 1963

3,080,908
TERMINAL WIRE FORMING AND ASSEMBLY APPARATUS FOR ELECTRICAL COMPONENTS
Felix S. Weiss, Chestnut Hill, Mass., assignor to Cornell-Dubilier Electric Corporation, South Plainfield, N.J., a corporation of Delaware
Filed Mar. 13, 1959, Ser. No. 799,379
2 Claims. (Cl. 153—6)

This invention relates to certain improvements in machines for manufacturing capacitors, and similar relatively small electrical instrumentalities incorporating a plurality of extending terminal wires, by production line methods in which an effectively endless conveying medium, such as, in the preferred form here shown, a dispensable strip of flexible paperlike material, sequentially advances the material from which the capacitor or other electrical instrumentality is to be assembled and finally the capacitor or other instrumentality itself to various operating stations at which sequential steps of assembly and eventually final processing and, if desirable, testing of the completed units are performed.

This application is a continuation-in-part of my application Serial No. 579,679, filed April 20, 1956, and now abandoned, and is particularly concerned, as will hereinafter more fully be described, with improved structures for a processing station at which the ends of web mounted capacitor terminal subassemblies are deformed to prepare the same for introduction of ceramic disc capacitor units therebetween and with the provision of an article subassembly of a particular and commercially advantageous character.

The mechanical improvements and operations which are the subject of this invention are particularly adaptable to the above described general method of assembly and production for the principles, purpose and object of increasing the production efficiency and the quality and uniformity of the articles so produced. While its principles may be advantageously used in the production of capacitors and other similar electrical instrumentalities such as resistors and rectifiers in various sizes and shapes and which incorporate a plurality of extending terminal wires and may be applied whether the conveying strip be made of one flexible material or another, the present invention is particularly useful in the production of ceramic disc capacitors which include a relatively small ceramic dielectric disc with a layer of conducting material disposed on each of the opposite faces thereof and serving as the electrode elements for the capacitor units. In the assembling of such units, suitable terminal or lead wires are secured to the conducting layers on the ceramic discs and the disc and adjacent portions of the terminal wires secured thereto are covered with a coating of insulating material.

The success of the use of continuous assembly methods of the general type described in the manufacture of these ceramic disc type capacitors depends not only upon the rapidity and continuous flow of operations at the various assembly and processing stations, but also upon the accuracy and reproducibility of those operations at each station all to the end that each capacitor as it comes to a point of completion, is as much like the preceding and following capacitors as possible.

These objectives are materially aided by the provision of an operating station adapted to deform or otherwise condition the extending portions of a web mounted terminal wire subassembly in such manner as to permit insertion and retention of an electrode surfaced ceramic disc therebetween and by the provision of a web mounted terminal wire subassembly per se so arranged as to permit subsequent insertion and retention of an electrode surfaced ceramic disc therein.

This invention may be briefly described as an improved apparatus for effecting the deformation of the extending end portions of web mounted terminal wire subassemblies and includes means for positioning a web mounted terminal wire subassembly, means for displacing the extending end portions thereof out of coplanar relationship and means for deforming said extending ends to prepare the same to receive and retain an electrode surfaced ceramic disc inserted therebetween and, in its broader aspects, to include the provision of a web mounted terminal wire subassembly of a particular and advantageous character.

Among the advantages attendant the instant invention is the provision of a web mounted terminal wire subassembly of a character such as to permit the insertion of an electrode surfaced ceramic disc between the ends thereof and retention of the same without utilization of additional fastening means during subsequent displacement of the conveying medium. Additionally, the deformed terminal wire subassembly and its mounting on the conveying web integrally cooperate to retain the inserted ceramic disc and to minimize, if not actually preclude, undesired displacement of the terminal wire subassembly relative to the conveying medium as might be otherwise occasioned by conveyor medium displacement intermediate and through the sequentially arranged operating stations.

The object of this invention is the provision of improved apparatus for effecting deformation of the extending ends of a web mounted terminal subassembly in the continuous assembly production line method of fabricating ceramic disc capacitors and other similar relatively small electrical instrumentalities incorporating a plurality of extending terminal wires.

Another object of this invention is the provision of a web mounted terminal wire subassembly of a particular and advantageous character for continuous assembly methods of production of capacitors and other similar relatively small electrical instrumentalities incorporating a plurality of extending terminal wires.

Other objects and advantages of the invention herein described will be pointed out in the following disclosure and claims and will be illustrated in the accompanying drawings which disclose, by way of example, the principles underlying the invention and the presently preferred embodiment incorporating those principles, and by which said principles may be usefully employed in the continuous assembly methods of production of ceramic disc capacitors and similar relatively small electrical instrumentalities incorporating a plurality of extending terminal wires of a high degree of uniformity and with reduced fabrication costs.

Referring to the drawings:

FIGURE 1 is a schematic plan view of a strip conveyor supporting terminal wire subassemblies which may conveniently be employed in the practice of the herein disclosed invention.

FIGURE 2 is a front elevational view, partially in section, of the presently preferred terminal wire end forming elements includible in a terminal wire subassembly and forming station.

FIGURE 3 is a section on the line 3—3 of FIGURE 2.
FIGURE 4 is a section on the line 4—4 of FIGURE 2.
FIGURE 5 is a section on the line 5—5 of FIGURE 4.
FIGURE 6 is a section on the line 6—6 of FIGURE 2.
FIGURE 7 is an enlarged plan view of the deforming slides in separated position.
FIGURE 8 is an enlarged plan view of the deforming slides in closed position.
FIGURE 9 is a schematic plan view of the strip conveyor supporting the terminal wire subassemblies after the extending ends thereof have been deformed by passage through the apparatus illustrated in FIGURES 2 to 8.

As indicated above, the subject matter of the herein disclosed and claimed invention is of particular utility in the fabrication of ceramic disc type capacitors or other similar relatively small electrical instrumentalities incorporating a plurality of extending terminal wires by continuous assembly production line methods. For the purpose of convenience, the herein specifically disclosed and described embodiment will be one that is particularly adapted for use as one of a plurality of sequentially arranged operating stations operable for the fabrication of ceramic disc capacitors continuous assembly production line methods incorporating a dispensable conveyor strip.

By way of general introduction, FIGURE 1 illustrates a portion of an elongate conveyor strip 10, which may be formed, of paperlike material as described in my copending application Serial No. 799,200 filed, March 13, 1959, for example. As described in detail therein, the web 10 preferably has the properties of flexibility, internal resilience or elastic resistance to deformation and condition impervious mechanical strength. C–3 Kraft Insulation Sheet as manufactured by the Steven Paper Mills Inc., of Windsor, Connecticut, in thickness of .010 inch has been found to be suitable for use in the practice of the herein disclosed invention. The conveyor strip 10 is preferably provided with a series of uniformly spaced indexing pilot holes 12, in addition to defining successive article subassembly receiving areas disposed therebetween, permits careful indexing of the conveyor material in the idividual operating stations as well as conveniently providing means by which the web of conveyor material may be advanced during each operational cycle. In addition, the strip 19 is provided with a plurality of spaced pairs of transversely aligned longitudinal slits 14 disposed intermediate successive pilot hole perforations 12 defining article retaining straps 16, which when raised above the plane of the remainder of the strip partly define a transversely disposed terminal wire subassembly receiving channel. Disposed within the terminal wire subassembly receiving channel is a terminal wire subassembly comprising an elongate U-shaped terminal wire 18 of the hairpin type having a curved end 20 extending beyond one edge of the strip 10 and the open ends 22 thereof disposed in coplanar relationship and extending beyond the other edge of the strip 10. Apparatus for effecting the insertion of the terminal wires in the terminal wire subassembly receiving channels and a more detailed description of the web mounted terminal wire subassemblies as so constituted are set forth in my copending application Serial No. 799,179 filed March 13, 1959, now Patent No. 3,079,957.

FIGURES 2 through 8 illustrate, by way of example, the essentials of presently preferred mechanical elements incorporating the principles of the invention that are includable in a terminal wire subassembly deforming station in the continuous assembly production line method fabrication system for ceramic disc capacitors, wherein the extending ends 22 of web mounted terminal wire subassemblies, as illustrated in FIGURE 1, are deformed into crossed relationship, as illustrated in FIGURE 9, so as to prepare the same to receive and retain electrode surfaced ceramic discs insertable therebetween.

Referring to the above identified drawings and particularly to FIGURES 2 to 8 thereof, there is provided a stationary die pad 24 having a twisting die block 26 mounted therein and containing a pair of pilot pin receiving bores 28, 30 in the adjacent web supporting surface 32 thereof, the bores being positioned thereon in alignment with the path of advance of the pilot pin indexing perforations 12 in the advancing web material 10. The pilot pin receiving bores 28, 30 are spaced apart a distance equal to that between successive perforations 12 in said web material 10. The twisting die block 26 is located so as to be disposed adjacent the edge of the web 10 and to successively engage the undersurface of the rounded edge portions 20 (see FIGURE 1) of the successively advancing web mounted terminal wire subassemblies that extends beyond the edge of the web 10. Positioned in front of the stationary die pad 24 is a stationary die block section 34. The die block section 34 is provided with a diagonally disposed raised shoulder 36 on the upper surface thereof terminating in a generally triangularly shaped wire forming anvil receiving aperture 38. The lower surface 40 of the die section 34, i.e. that disposed beneath the raised shoulder 36, is positioned to be substantially coplanar with the web supporting surface 32 of the stationary die pad 24. The diagonally disposed raised shoulder 36 is preferably of a height slightly greater than the thickness of the terminal wire 18 that is to be employed for the web mounted terminal wire subassemblies.

Positioned above the stationary die pad 24 is a vertically reciprocable punch pad 42 having a twisting punch member 44, a pair of pilot pins 46, 48, a specially contoured web holding insert 50 and a dependent elongate wire forming anvil member 52 mounted thereon and positioned in alignment, respectively, with the previously described twisting die block 26, the pilot pin receiving bores 28, 30, the web supporting surface 32, and the anvil receiving aperture 38 associated with the stationary die pad 34.

With respect to the type of ceramic disc capacitor here of concern, it is required that the extending open and coplanar end portions 22 of the web mounted terminal wire subassembly be initially disposed in different planes to permit the necessary deformation thereof to the crossed shape illustrated in FIGURE 9. To effect the requisite planar differentiation of the undeformed extending open end portions 22 of the web mounted terminal wire subassembly, the terminal engaging surfaces of the twisting die block 26 and the twisting punch member 44 are skewed as best shown at 54 in FIGURE 5. Cooperating therewith to effect the planar differentiation between the extending open ends 22 of the terminal wire subassembly is the dependent surface contour of the web holding insert 50 mounted in the vertically reciprocable punch pad 42. The essentials of a suitable surface contour for the web holding insert 50 is shown in FIGURES 6 and 4 and preferably includes a pair of longitudinally disposed recessed channels 56 sized to contain the raised portions 16 of the web 10 disposed between the longitudinal slits 14 in each pair of slits and disposed in overlying relation to the mounted terminal wire subassembly 18, a transversely disposed extending or raised center section 58 sized to compressively engage the portions of the web material 10 disposed beneath the web mounted terminal wire subassembly and intermediate the elongate arms thereof and a pair of elongate transversely disposed recessed channels 60 disposed in alignment with the arms of the web mounted terminal wire subassembly and sized to permit limited play thereof relative to the portions of the web 10 compressively engaged by the raised center section 58. In its essentials, the surface contour of the web holding insert 50 should be such as to compressively position the portion of the web 10 disposed beneath the terminal wire subassembly and intermediate the elongate arms thereof against the adjacent portions of supporting surface 32 in the die pad 24, but yet permit sufficient room for a slight vertical displacement of the arms of the web mounted generally U-shaped terminal wire subassembly 18 and the portions 16 of the web material overlaying the same under influence of the twisting action being effected by the cooperative action of the twisting die block 26 and the twisting punch member 44. The combined result of preventing web displacement and permitting the twisting of the terminal subassembly from the extending rounded end 20 thereof is to tend to lower one of the extending open ended arms of the web mounted terminal wire subassembly and to raise the other. The lowering of the one free end, however, will be prevented by the surface 40 of the die block section 34 and the net result thereof will be to maintain said end firmly disposed against said surface 40. All displacement, therefore, will take place with the other extending end of said web mounted terminal wire subassembly, which will be raised above the elevated surface of the die block section 34 as defined by the raised shoulder 36 thereon.

The dependent wire forming anvil member 52 is positioned so as to be received by the aperture 38 and disposed intermediate the open extending ends 22 of the web mounted terminal wire subassembly 18 being operated upon. In the specifically illustrated structure it is shaped so as to define the desired degree of bend for said extending ends and is of a generally triangular configuration.

Before turning to the additional mechanical elements which effect the desired bending deformation of the open extending ends of the web mounted terminal wire subassembly around the operating surfaces of the wire forming anvil member 52, I will briefly review the sequence of operations effected by the mechanical elements heretofore described. In operation of the unit, the vertically reciprocable punch pad 42 is maintained at its uppermost limit of displacement as the web 10, having the terminal wire subassemblies mounted thereon as illustrated in FIGURE 1, is advanced during a web advance cycle of operation by a suitable web driving mechanism. Upon cessation of web advance, an undeformed terminal assembly is generally positioned intermediate the pilot pin receiving bores 28 and 30. Downward displacement of the vertically reciprocable pressure pad 42 results in engagement of the pilot pin indexing apertures 12 in the web 10 by the descending pilot pins 46, 48 and in any required corrective positioning of the web mounted terminal wire subassembly 18 to be operated upon relative to the mechanical deforming elements included in this operating station. Coincidentally therewith, the dependent wire forming anvil member 52 will enter its receiving aperture 38 and will be positioned intermediate the open extending coplanar ends 22 of the web mounted terminal wire subassembly 18. Continued downward displacement of the pressure pad 42 relative to the stationary die pad 24 results in engagement of the extended round end portions 20 of the web mounted terminal wire subassembly 18 by the skewed operating surfaces 54 of the twisting punch member 44. Coincidentally therewith the contoured operating surface 58 of the web holding insert 50 engages that portion of the surface of the web 10 that is disposed beneath the terminal wire subassembly and intermediate the arms thereof and compressively maintains the same against the adjacent portions of the web supporting surface 32 in the stationary die pad 24. The twisting movement effected by the skewed surfaces 54 of the twisting die block 26 and the twisting punch member 44 relative to the firmly positioned portions of the web material 10 will, as described earlier, result in the maintaining of one of the extending ends of the web mounted terminal wire subassembly 18 disposed against the surface 40 of the die section 34 and in the elevation of the other extending end of the web mounted terminal wire subassembly above the adjacent elevated surface of the die section 34 as defined by the raised shoulder 36 thereon. With the extending open ends of the web mounted terminal wire subassembly 18 so positioned on either side of the wire forming anvil 52 in planar differentiation, the unit is then properly positioned for the necessary deformation of the extending end portions 22 thereof.

The desired deformation of the extending ends of the web mounted terminal wire subassembly is effected by a pair of horizontally displaceable wire deforming slides generally designated 64, 66 and which are mounted on the front face of the vertically reciprocable pressure pad 42 so as to be horizontally displaced into engagement with the extending terminal wire ends and to bend the same into conformity with the adjacent operating surfaces of the wire forming anvil 52. As best shown in FIGURES 2 and 6–8, the deforming slide 64 is provided with an extending horizontally disposed wire engaging foot 68 adapted to ride on the surface 40 of the die section 34. The foot 68 is provided with a wire engaging edge portion contoured to conform with the adjacent operating surface of the wire forming anvil 52. The second wire deforming slide 66 is provided with a wire engaging foot 70 adapted to ride on the upper surface of the die section 34 as defined by the raised shoulder 36. The foot 70 is provided with a wire engaging edge portion contoured to conform with the adjacent operating surface of the wire forming anvil 52. The first slide member 64 is suitably recessed above the wire engaging foot portion 68 thereof to permit receipt therein of the end of the wire engaging foot 70 of the second wire deforming slide 66 when said slides are displaced into operative engagement with each other as illustrated in FIGURES 6 and 8.

As previously described, downward displacement of the pressure pad 42 relative to the stationary die block 24 results in planar differentiation of the extending ends of the web mounted terminal wire subassembly disposed on either side of the wire forming anvil member 52. With the extending ends 22 so positioned, the horizontally reciprocable wire deforming slide members 64 and 66 are displaced towards each other. The displacement of the slide 64 results in engagement of the extended end of the terminal wire that rests on the surface 40 of the die section 34 by the wire engaging edge portion of the extended foot 68 thereof and in a bending of said extending wire end into conformance with the shape of the adjacent operating surface of the anvil member 52. In a similar manner, simultaneous horizontal displacement of the second slide 66 results in deformation of the elevated wire end into conformance with that of the adjacent operating surface of the wire forming anvil 52.

After the deformation of the extending ends 22 of the web mounted terminal wire subassembly 18 has been effected by the conjoint action of the deforming slides 64 and 66 and the adjacent operating surfaces of the wire forming anvil 52 as described above, the deforming slides 64, 66 are retracted in conjunction with an upward displacement of the vertically reciprocable pressure pad 42. The thus effected release of the web 10 and the now deformed terminal wire subassembly mounted thereon permits the arms of the terminal wire subassembly to attempt to return to a coplanar relationship. However, the now deformed crossed ends as shown in FIGURE 9 prohibit a complete return to such condition and result in a compressive engagement between said crossed ends at the point of contact thereof. After the pressure pad 42 reaches its limit of upward displacement, the next cycle of web advance permits delivery from the above described operating station of a web mounted deformed terminal wire subassembly such as illustrated in FIGURE 9.

In a web mounted capacitor terminal wire subassembly as constituted in FIGURE 9 the engagement of the wire subassembly 18 disposed within the receiving channel by the overlying retaining straps 16 and the underlying portions of the web 10 further contribute to a maintenance of a compressive engagement intermediate the crossed ends thereof by adding to the operative forces tending to return the arms of the wire subassembly to a coplanar relationship. In such a web mounted terminal wire subassembly the resulting compressive engagement between the crossed ends thereof has been found sufficient to permit retention of a ceramic disc capacitor element inserted therebetween during the normal flexing and bending of the web 10 as would be effected by its displacement to a subsequent operating station. In addition thereto generally the disposition of the wire ends in crossed relation contributes to the desired engagement of the wire subassembly by the web 10 and aids in minimizing, if not actually preventing, undesired displacement of the wire subassembly relative to the web as might be occasioned by strip flexing and bending encountered during its advance.

Having thus described my invention, I claim:

1. In a fabricating machine for electrical components such as ceramic disc capacitors and similar relatively small electrical instrumentalities incorporating a plurality of extending terminal wires and of the class wherein an advancing web of dispensable conveyor material serves as a carrier for the electrical component constituent elements and progressively formed subassemblies thereof during the sequential stages of the fabricating process, apparatus for permanently deforming the extending open coplanar ends of the elongate generally U-shaped terminal wire subassembly mounted on said web conveyor into crossed relationship comprising reciprocable anvil means positioned to be disposed, upon downward displacement thereof, intermediate the extending open ends of said web mounted terminal wire subassembly, means engageable with said U-shaped terminal wire subassembly remote from the extending open end thereof for elastically displacing at least one of said extending ends of said terminal wire subassembly from said coplanar relationship and means operable subsequent to the elastic displacement of said one of said extending ends for bending said extending wire ends around said anvil means to effect the desired permanent deformation of said extending open ends of said web mounted terminal wire subassembly into crossed relationship.

2. In a fabricating machine for electrical components such as ceramic disc capacitors and similar relatively small electrical instrumentalities incorporating a plurality of extending terminal wires and of the class wherein an advancing web of dispensable conveyor material serves as a carrier for the electrical component constituent elements and progressively formed subassemblies thereof during the sequential stages of the fabricating process, apparatus for permanently deforming the extending open coplanar ends of an elogate generally U-shaped terminal wire subassembly mounted on said web conveyor comprising a stationary die block, a reciprocating pressure member associated therewith having a dependent wire forming anvil positioned to be disposed, upon downward displacement thereof, intermediate the extending open ends of said web mounted terminal wire subassembly, complementary shaped means included in said pressure member and said stationary die block and engageable with said U-shaped terminal wire subassembly remote from the extending end thereof and with said conveyor material disposed adjacent thereto for elastically displacing at least one of said extending ends of said terminal wire subassembly from said coplanar relationship and a pair of displaceable slide members operable subsequent to elastic displacement of said one of said extending arms of said terminal wire subassembly for bending said extending wire ends around said wire forming anvil positioned therebetween to effect the desired permanent deformation of said extending open ends of said web mounted terminal wire subassembly into crossed relationship.

References Cited in the file of this patent
UNITED STATES PATENTS

| | | |
|---|---|---|
| 1,628,581 | Dinkel | May 10, 1927 |
| 2,327,440 | Maize | Aug. 24, 1943 |
| 2,554,350 | Vines | May 22, 1951 |
| 2,602,988 | Klym | July 15, 1952 |
| 2,899,611 | Bradley et al. | Aug. 11, 1959 |
| 2,928,453 | Cihlar et al. | Mar. 15, 1960 |